US007135957B2

(12) United States Patent
Wilson

(10) Patent No.: US 7,135,957 B2
(45) **Date of Patent: *Nov. 14, 2006**

(54) UNIVERSAL GARAGE DOOR OPERATING SYSTEM AND METHOD

(75) Inventor: Robert H. Wilson, Howell, MI (US)

(73) Assignee: Lear Corporation, Southfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/256,349

(22) Filed: Oct. 21, 2005

(65) Prior Publication Data

US 2006/0038656 A1 Feb. 23, 2006

Related U.S. Application Data

(63) Continuation of application No. 10/025,276, filed on Dec. 19, 2001.

(51) Int. Cl.
*H04Q 9/00* (2006.01)
*H02B 1/24* (2006.01)
*E05B 47/00* (2006.01)

(52) U.S. Cl. .................... 340/5.61; 340/5.71; 307/139; 307/114; 307/117; 307/176; 318/16; 49/19; 49/18; 49/75

(58) Field of Classification Search ............... 340/5.61, 340/5.71; 307/139, 114, 117, 176; 318/16; 49/17, 18, 25

See application file for complete search history.

(56) References Cited

U.S. PATENT DOCUMENTS

| | | | |
|---|---|---|---|
| 1,522,241 | A | 1/1925 | Hennessey |
| 3,098,212 | A | 7/1963 | Creamer, Jr. |
| 3,300,867 | A | 1/1967 | Sampson |
| 3,337,992 | A | 8/1967 | Tolson |
| 3,456,387 | A | 7/1969 | Tolson |
| 3,680,951 | A | 8/1972 | Jordan et al. |
| 4,074,200 | A | 2/1978 | Buchta |
| 4,167,833 | A | 9/1979 | Farina et al. |
| 4,178,549 | A | 12/1979 | Ledenbach et al. |
| 4,219,812 | A | 8/1980 | Rittenbach |
| 4,241,870 | A | 12/1980 | Marcus |
| 4,247,850 | A | 1/1981 | Marcus |
| 4,425,717 | A | 1/1984 | Marcus |
| 4,447,808 | A | 5/1984 | Marcus |
| 4,453,161 | A | 6/1984 | Lemelson |
| 4,482,947 | A | 11/1984 | Zato et al. |
| 4,529,980 | A | 7/1985 | Liotine et al. |
| 4,535,333 | A | 8/1985 | Twardowski |

(Continued)

FOREIGN PATENT DOCUMENTS

EP 0 670 402 A1 9/1995

(Continued)

*Primary Examiner*—Jeffery Hofsass
*Assistant Examiner*—Scott Au
(74) *Attorney, Agent, or Firm*—Brooks Kushman P.C.

(57) ABSTRACT

A universal garage door operating system and method. In one embodiment, a vehicle transmitter is provided transmitting a wireless garage door transmitter control signal. A control module is provided for mounting in a structure such as a garage, and is adapted to receive a wireless garage door transmitter. The control module includes a receiver for receiving the garage door transmitter control signal, a controller for generating a garage door transmitter actuator control signal in response to the garage door transmitter control signal, and an actuator for actuating the garage door transmitter in response to the garage door actuator control signal so that the garage door transmitter transmits a wireless garage door control signal for use in operating a garage door.

20 Claims, 2 Drawing Sheets

U.S. PATENT DOCUMENTS 4,581,827 A 4/1986 Higashi
4,595,228 A 6/1986 Chu
4,598,287 A 7/1986 Osakabe et al.
4,623,887 A 11/1986 Wells, II
4,631,708 A 12/1986 Wood et al.
4,635,033 A 1/1987 Inukai et al.
4,638,433 A 1/1987 Schindler
4,665,397 A 5/1987 Pinnow
4,676,601 A 6/1987 Itoh et al.
4,706,299 A 11/1987 Jorgensen
4,707,788 A 11/1987 Tashiro et al.
RE32,576 E 1/1988 Pastore
4,727,302 A 2/1988 Mizuta et al.
4,743,905 A 5/1988 Wiegand
4,747,159 A 5/1988 Kato
4,750,118 A 6/1988 Heitschel et al.
4,754,255 A 6/1988 Sanders et al.
4,771,283 A 9/1988 Imoto
4,793,690 A 12/1988 Gahan et al.
4,806,930 A 2/1989 Wojciak, Jr.
4,825,200 A 4/1989 Evans et al.
4,881,148 A 11/1989 Lambropoulos
4,882,565 A 11/1989 Gallmeyer
4,886,960 A 12/1989 Molyneux et al.
4,890,108 A 12/1989 Drori et al.
4,896,030 A 1/1990 Miyaji
4,905,279 A 2/1990 Nishio
4,912,463 A 3/1990 Li
4,917,477 A 4/1990 Bechtel et al.
4,953,305 A 9/1990 Van Lente et al.
4,978,944 A 12/1990 Andros et al.
4,988,992 A 1/1991 Heitschel et al.
5,016,996 A 5/1991 Ueno
5,064,274 A 11/1991 Alten
5,085,062 A 2/1992 Capdevila
5,103,221 A 4/1992 Memmola
5,109,222 A 4/1992 Welty
5,113,821 A 5/1992 Fukui et al.
5,122,647 A 6/1992 Lynam et al.
5,123,008 A 6/1992 Beesley
5,126,686 A 6/1992 Tam
5,146,215 A 9/1992 Drori
5,154,617 A 10/1992 Suman et al.
5,181,423 A 1/1993 Philiipps et al.
5,191,610 A 3/1993 Hill et al.
5,193,210 A 3/1993 Nicholas et al.
5,201,067 A 4/1993 Grube et al.
5,225,847 A 7/1993 Roberts et al.
5,243,322 A 9/1993 Thompson et al.
5,252,960 A 10/1993 Duhame
5,252,977 A 10/1993 Lueker et al.
5,266,945 A 11/1993 Peek et al.
5,278,547 A 1/1994 Suman et al.
5,369,706 A 11/1994 Latka
5,379,453 A 1/1995 Tigwell
5,402,105 A 3/1995 Doyle et al.
5,408,698 A 4/1995 Serizawa et al.
5,412,379 A 5/1995 Waraksa et al.
5,420,925 A 5/1995 Michaels
5,442,340 A 8/1995 Dykema
5,455,716 A 10/1995 Suman et al.
5,463,374 A 10/1995 Mendez et al.
5,471,668 A 11/1995 Soenen et al.
5,473,317 A 12/1995 Inomata et al.
5,475,366 A 12/1995 Van Lente et al.
5,479,155 A 12/1995 Zeinstra et al.
5,517,187 A 5/1996 Bruwer et al.
5,528,230 A 6/1996 Kim
5,554,977 A 9/1996 Jablonski et al.
RE35,364 E 10/1996 Heitschel et al.
5,564,101 A 10/1996 Eisfeld et al.
5,583,485 A 12/1996 Van Lente et al.
5,594,429 A 1/1997 Nakahara
5,596,316 A 1/1997 Honeck
5,598,475 A 1/1997 Soenen et al.
5,613,732 A 3/1997 Demick
5,614,885 A 3/1997 Van Lente et al.
5,614,891 A 3/1997 Zeinstra et al.
5,619,190 A 4/1997 Duckworth et al.
5,627,529 A 5/1997 Duckworth et al.
5,645,308 A 7/1997 Fink
5,646,701 A 7/1997 Duckworth et al.
5,661,455 A 8/1997 Van Lente et al.
5,661,651 A 8/1997 Geschke et al.
5,661,804 A 8/1997 Dykema et al.
5,680,131 A 10/1997 Utz
5,680,134 A 10/1997 Tsui
5,686,903 A 11/1997 Duckworth et al.
5,686,904 A 11/1997 Bruwer
5,691,848 A 11/1997 Van Lente et al.
5,699,044 A 12/1997 Van Lente et al.
5,699,054 A 12/1997 Duckworth
5,699,055 A 12/1997 Dykema et al.
5,708,415 A 1/1998 Van Lente et al.
5,715,020 A 2/1998 Kuroiwa et al.
5,731,756 A 3/1998 Roddy
5,751,224 A 5/1998 Fitzgibbon
5,793,300 A 8/1998 Suman et al.
5,812,097 A 9/1998 Maldonado
5,831,548 A 11/1998 Fitzgibbon
5,838,255 A 11/1998 Di Croce
5,841,253 A 11/1998 Fitzgibbon et al.
5,841,390 A 11/1998 Tsui
5,841,813 A 11/1998 van Nee
5,854,593 A 12/1998 Dykema et al.
5,872,513 A 2/1999 Fitzgibbon et al.
5,903,226 A 5/1999 Suman et al.
5,926,087 A 7/1999 Busch et al.
5,926,106 A 7/1999 Beran et al.
5,940,000 A 8/1999 Dykema
5,940,120 A 8/1999 Frankhouse et al.
5,949,349 A 9/1999 Farris et al.
6,002,332 A 12/1999 King
6,005,508 A 12/1999 Tsui
6,008,735 A 12/1999 Chiloyan et al.
6,021,319 A 2/2000 Tigwell
6,025,785 A 2/2000 Farris et al.
6,043,753 A 3/2000 Okayasu et al.
6,049,289 A 4/2000 Waggamon et al.
RE36,703 E 5/2000 Heitschel et al.
6,072,436 A 6/2000 Marougi
6,078,271 A 6/2000 Roddy et al.
6,081,203 A 6/2000 Fitzgibbon
6,091,343 A 7/2000 Dykema et al.
6,127,740 A 10/2000 Roddy et al.
6,130,625 A 10/2000 Harvey
6,131,019 A 10/2000 King
6,137,421 A 10/2000 Dykema
6,154,544 A 11/2000 Farris et al.
6,166,650 A 12/2000 Bruwer
6,175,312 B1 1/2001 Bruwer et al.
6,181,255 B1 1/2001 Crimmins et al.
6,191,701 B1 2/2001 Bruwer
6,243,000 B1 6/2001 Tsui
6,249,673 B1 6/2001 Tsui
6,271,765 B1 8/2001 King et al.
6,308,083 B1 10/2001 King
6,320,514 B1 11/2001 Flick
6,333,698 B1 12/2001 Roddy
6,344,817 B1 2/2002 Verzulli
6,359,558 B1 3/2002 Tsui
6,362,771 B1 3/2002 Schofield et al.
6,414,587 B1 7/2002 Fitzgibbon
6,441,719 B1 8/2002 Tsui

| | | | |
|---|---|---|---|
| 6,486,795 | B1 | 11/2002 | Sobel et al. |
| RE37,986 | E | 2/2003 | Heitschel et al. |
| 6,525,645 | B1 | 2/2003 | King et al. |
| 6,556,681 | B1 | 4/2003 | King |
| 6,556,813 | B1 | 4/2003 | Tsui |
| 6,559,775 | B1 | 5/2003 | King |
| 6,597,291 | B1 | 7/2003 | Tsui |
| 6,634,408 | B1 | 10/2003 | Mays |
| 6,690,796 | B1 | 2/2004 | Farris et al. |
| 6,703,941 | B1 | 3/2004 | Blaker |
| 6,810,123 | B1 | 10/2004 | Farris et al. |
| 6,822,603 | B1 | 11/2004 | Crimmins et al. |
| 2002/0034303 | A1 | 3/2002 | Farris et al. |
| 2002/0067826 | A1 | 6/2002 | King |
| 2002/0075133 | A1 | 6/2002 | Flick |
| 2002/0126037 | A1 | 9/2002 | Fitzgibbon |
| 2002/0137479 | A1 | 9/2002 | Tsui |
| 2002/0140569 | A1 | 10/2002 | Van Ee et al. |
| 2002/0163440 | A1 | 11/2002 | Tsui |
| 2002/0191794 | A1 | 12/2002 | Farris et al. |
| 2002/0197955 | A1 | 12/2002 | Witkowski et al. |
| 2003/0016119 | A1 | 1/2003 | Teich |
| 2003/0016139 | A1 | 1/2003 | Teich |
| 2003/0033540 | A1 | 2/2003 | Fitzgibbon |
| 2003/0067394 | A1 | 4/2003 | Tsui |
| 2003/0076235 | A1 | 4/2003 | Tsui |
| 2003/0112121 | A1* | 6/2003 | Wilson ...................... 340/5.61 |
| 2003/0118187 | A1 | 6/2003 | Fitzgibbon |
| 2003/0189530 | A1 | 10/2003 | Tsui |
| 2003/0197594 | A1 | 10/2003 | Olson et al. |
| 2003/0197595 | A1 | 10/2003 | Olson et al. |
| 2003/0216139 | A1 | 11/2003 | Olson et al. |
| 2003/0228879 | A1 | 12/2003 | Witkowski et al. |
| 2004/0048622 | A1 | 3/2004 | Witkowski et al. |
| 2004/0066936 | A1 | 4/2004 | Farris et al. |
| 2004/0110472 | A1 | 6/2004 | Witkowski et al. |
| 2004/0243813 | A1 | 12/2004 | Farris et al. |
| 2005/0024184 | A1 | 2/2005 | Chuey |
| 2005/0024185 | A1 | 2/2005 | Chuey |
| 2005/0024229 | A1 | 2/2005 | Chuey |
| 2005/0024230 | A1 | 2/2005 | Chuey |
| 2005/0024254 | A1 | 2/2005 | Chuey |
| 2005/0024255 | A1 | 2/2005 | Chuey |
| 2005/0026601 | A1 | 2/2005 | Chuey |
| 2005/0026602 | A1 | 2/2005 | Chuey et al. |
| 2005/0026605 | A1 | 2/2005 | Guthrie et al. |

FOREIGN PATENT DOCUMENTS

| | | | |
|---|---|---|---|
| GB | 2171545 | A | 8/1986 |
| GB | 2182790 | A | 10/1986 |
| GB | 2302751 | | 6/1996 |
| GB | 2336433 | | 4/1999 |
| GB | 2335773 | A | 9/1999 |
| GB | 2366433 | | 5/2000 |
| WO | WO 94/02920 | | 7/1993 |
| WO | WO 00/29699 | | 5/2000 |

* cited by examiner

UNIVERSAL GARAGE DOOR OPERATING SYSTEM AND METHOD

This application is a continuation of application Ser. No. 10/025,276 filed on Dec. 19, 2001.

BACKGROUND OF THE INVENTION

1. Field of the Invention

The present invention relates to a universal system and method for use with a garage door operating system.

2. Background

Garage door operating systems are well known in the art. Such systems typically include at least one wireless transmitter and a garage door actuator. The actuator generally comprises an electric motor for driving a screw gear or chain to open or close a garage door. A receiver and controller are also typically provided for receiving signals from the wireless transmitter, and controlling the actuator.

In operation, in order to open or close the garage door, a user activates the transmitter. Upon such activation, the transmitter transmits a wireless, usually radio frequency (RF), signal to the receiver. In response, the controller activates the garage door actuator to open or close the garage door. For security purposes, the receiver may be manually set to recognize the transmitter, such as through switch settings, or the receiver may be pre-set to recognize an identification signal from a particular transmitter. To further improve security, the wireless signal from the transmitter is also typically encrypted.

Wireless garage door transmitters from such systems are generally kept in a vehicle for use by a vehicle occupant to open or close the garage door in order to gain access to or depart from a garage. It is known in the automotive industry, however, to provide vehicles with wireless vehicle transmitters which can be used in place of, or in addition to, such garage door transmitters. However, such transmitters, which may be built-in or mounted to the vehicle, must be taught to emulate the wireless garage door transmitter. Such a process requires placing the vehicle transmitter into a programming or learn mode, and using the garage door transmitter to tune the vehicle transmitter to the garage door transmitter. Such a process can prove complicated and difficult for many users.

Thus, there exists a need for a system and method for use with a garage door operating system that would overcome the problem of tuning a vehicle transmitter. Such a system and method would preferably include a control module for mounting in a garage having a garage door, the control module adapted to receive a wireless garage door transmitter. Such a module would preferably include a controller, a garage door transmitter actuator, and a receiver. Upon receipt by the receiver of a wireless signal from a vehicle transmitter, the controller would control the actuator to activate the garage door transmitter so that the garage door transmitter would transmits a wireless garage door control signal for use in operating a garage door. In such a fashion, such a system and method would overcome the vehicle transmitter tuning problem described above, and would be universally compatible with any garage door operating system.

SUMMARY OF THE INVENTION

Accordingly, an object of the present invention is to provide a universal system and method for use with a garage door operating system.

According to the present invention, then, for use with a garage door operating system comprising a wireless garage door transmitter, a system is provided for actuating the garage door transmitter. They system comprises a vehicle transmitter for transmitting a wireless garage door transmitter control signal, and a control module for mounting in a structure comprising a garage, the control module adapted to receive the garage door transmitter. The control module comprises a receiver for receiving the garage door transmitter control signal, a controller to be provided in communication with the receiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door.

According to the present invention, for use with a garage door operating system comprising a wireless garage door transmitter, a method is also provided for actuating the garage door transmitter. The method comprises providing a control module for mounting in a structure comprising a garage, the control module adapted to receive the garage door transmitter. The control module comprises a receiver for receiving a wireless garage door transmitter control signal, a controller to be provided in communication with the receiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door.

According to another embodiment of the present invention, for use with a garage door operating system comprising a wireless garage door transmitter, a system is provided for actuating the garage door transmitter. In this embodiment, the system comprises a vehicle transceiver for receiving a wireless interrogation signal and automatically transmitting a wireless garage door transmitter control signal in response thereto, and a control module for mounting in a structure comprising a garage, the control module adapted to receive the garage door transmitter. The control module comprises a transceiver for automatically transmitting the interrogation signal, and for receiving the garage door transmitter control signal, a controller to be provided in communication with the transceiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door.

According to this same embodiment of the present invention, for use with a garage door operating system comprising a wireless garage door transmitter, a method also provided for actuating the garage door transmitter. The method comprises providing a control module for mounting in a structure comprising a garage, the control module adapted to receive the garage door transmitter. The control module comprises a transceiver for automatically transmitting a wireless interrogation signal and for receiving a wireless garage door transmitter control signal, a controller to be provided in communication with the transceiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door.

The preferred embodiments of the present invention are set forth in the following detailed descriptions thereof, including the accompanying drawings.

DETAILED DESCRIPTION OF THE PREFERRED EMBODIMENT(S)

Referring now to the Figures, the preferred embodiments of the present invention will now be described in detail. As previously noted, garage door operating systems are well known in the art. Such systems typically include at least one wireless transmitter and a garage door actuator. The actuator generally comprises an electric motor for driving a screw or chain to open or close a garage door. A receiver and controller are also typically provided for receiving signals from the wireless transmitter, and controlling the actuator.

As also noted previously, in operation, in order to open or close the garage door, a user activates the transmitter. Upon such activation, the transmitter transmits a wireless, usually radio frequency (RF), signal to the receiver. In response, the controller activates the garage door actuator to open or close the garage door. For security purposes, the receiver may be manually set to recognize the transmitter, such as through switch settings, or the receiver may be pre-set to recognize an identification signal from a particular transmitter. To further improve security, the wireless signal from the transmitter is also typically encrypted.

Such wireless garage door transmitters are generally kept in a vehicle for use by a vehicle occupant to open or close the garage door in order to gain access to or depart from a garage. It is known in the automotive industry, however, to provide vehicles with wireless vehicle transmitters which can be used in place of, or in addition to, such garage door transmitters. However, such transmitters, which may be built-in or mounted to the vehicle, must be taught to emulate the wireless garage door transmitter. Such a process requires placing the vehicle transmitter into a programming or learn mode, and using the garage door transmitter to tune the vehicle transmitter to the garage door transmitter. Such a process can prove complicated and difficult for many users.

Thus, there exists a need for a system and method for use with a garage door operating system that would overcome the problem of tuning a vehicle transmitter. Such a system and method would preferably include a control module for mounting in a garage having a garage door, the control module adapted to receive a wireless garage door transmitter. Such a module would preferably include a controller, a garage door transmitter actuator, and a receiver. Upon receipt by the receiver of a wireless signal from a vehicle transmitter, the controller would control the actuator to activate the garage door transmitter so that the garage door transmitter would transmits a garage door control signal for use in operating a garage door. In such a fashion, such a system and method would overcome the vehicle transmitter tuning problem described above, and would be universal in nature.

Figure 1A:
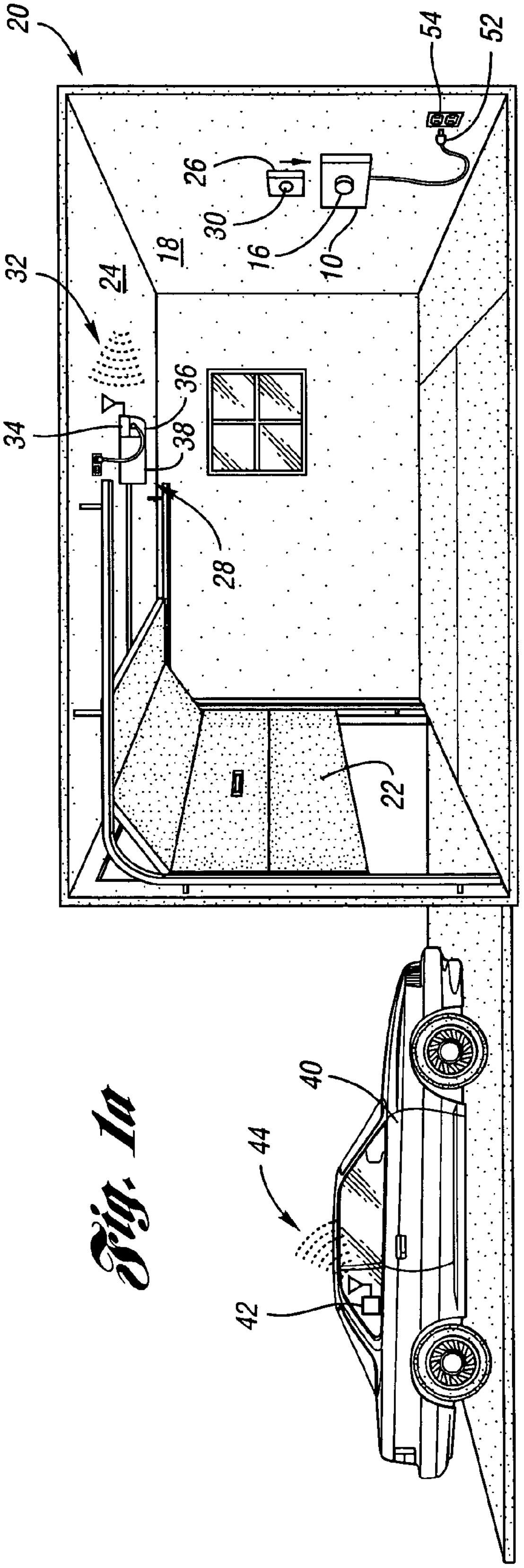
FIGS. 1*a* and 1*b* are simplified, exemplary block diagrams including one embodiment of the system of the present invention.
Figure 1B:
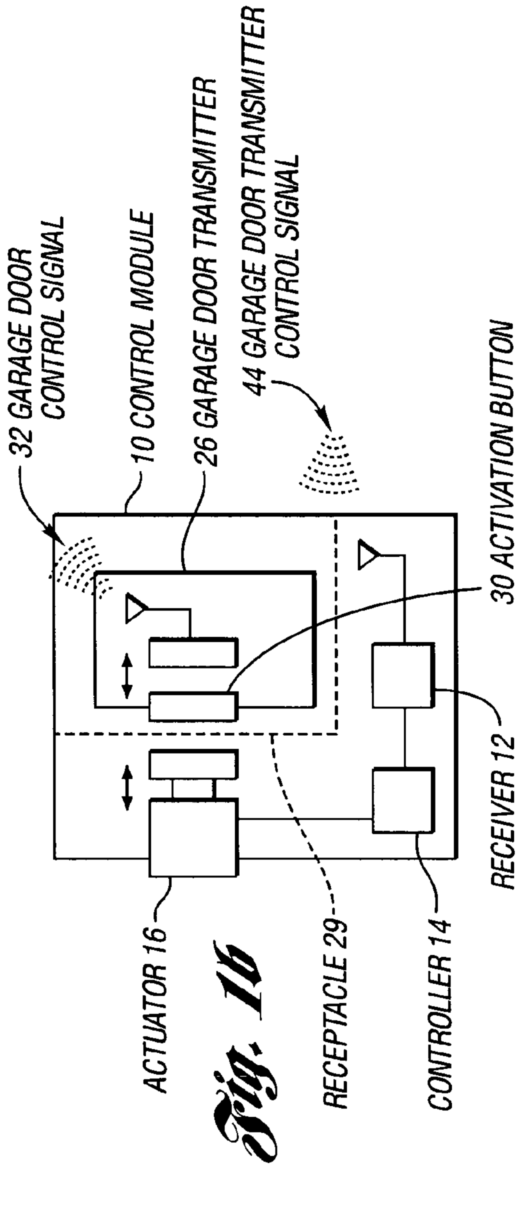

Referring now to FIGS. 1*a* and 1*b*, simplified, exemplary block diagrams including one embodiment of the system of the present invention are shown. As seen in FIG. 1*a*, the system comprises a control module (10). Control module (10) is adapted for mounting on a wall (18), such as inside a garage (20) having a garage door (22). It should be noted, however, that control module (10) could alternatively be mounted elsewhere, such as on ceiling (24) in garage (20) or at any other location in garage (20) or other structure, such as an attached house (not shown). In that regard, control module (10) is preferably provided on one surface thereof with an adhesive (not shown) suitable for binding control module (10) to wall (18) or ceiling (24). Alternatively, any means known in the art suitable for mounting control module (10) to wall (18) or ceiling (24), such as screws (not shown), may also be used.

As seen in FIG. 1*b*, control module (10) preferably comprises a receiver (12) provided in communication with a controller (14), which is in turn provided in communication with an actuator (16). Controller (14) preferably comprises a microprocessor, although any equivalent thereof may also be used. Actuator (16) preferably comprises a solenoid, although again any suitable equivalent may also be used. Control module (10) is adapted to receive and hold a wireless garage door transmitter (26), which is part of and adapted for use in a garage door operating system (28) for operating garage door (22). In that regard, as seen in both FIGS. 1*a* and 1*b*, garage door transmitter (26) is placed by a user in a housing or receptacle (29) in control module (10) adapted for that purpose.

As is well known in the art, garage door transmitter (26) includes an activation button (30) which, when depressed by a user, activates garage door transmitter (26) to transmit a wireless garage door control signal (32). As previously described, garage door operating system (28) includes a receiver (34), controller (36) and garage door actuator (38). Upon receipt by receiver (34) of garage door control signal (32) from garage door transmitter (26), controller (36) controls garage door actuator (38) to open or close garage door (22).

As seen in FIG. 1*a*, a vehicle (40) includes a vehicle transmitter (42). Vehicle transmitter (42) is preferably mounted or built-in vehicle (40). Alternatively, vehicle transmitter (42) could be a wireless transmitter provided with vehicle (40), such as in the form of a well-known key-fob (not shown). Vehicle transmitter (42) may be designed for manual activation by a vehicle occupant (not shown) to transmit a wireless control signal (44) for use in activating garage door transmitter (26) (i.e., "active"), or may be designed to at least periodically automatically transmit control signal (44) (i.e., "passive").

In either case, receiver (12) receives garage door transmitter control signal (44) from vehicle transmitter (42). In response thereto, controller (14) generates a garage door transmitter actuator control signal (not shown), which activates actuator (16). In that regard, upon placement of garage door transmitter (26) in receptacle (29) of control module (10), actuator (16) is preferably selectively moveable by a user in order to position actuator (16) adjacent activation button (30) of garage door transmitter (26). Upon activation by the actuator control signal, actuator (16) thus depresses activation button (30) of garage door transmitter (26), thereby causing garage door transmitter (26) to transmit wireless garage door control signal (32). As described above, the transmission of garage door control signal (32) then effects the opening or closing of garage door (22).

It should be noted here that where vehicle transmitter (42) automatically transmits garage door transmitter control signal (44), controller (14) preferably determines a signal strength of garage door transmitter control signal (44) and generates a garage door transmitter actuator control signal to activate actuator (16) only when the signal strength of garage door transmitter control signal (44) exceeds a selected threshold. In such a fashion, garage door (22) is opened or closed only when vehicle (40) is within a selected proximity to garage door (22).

Figure 2A:
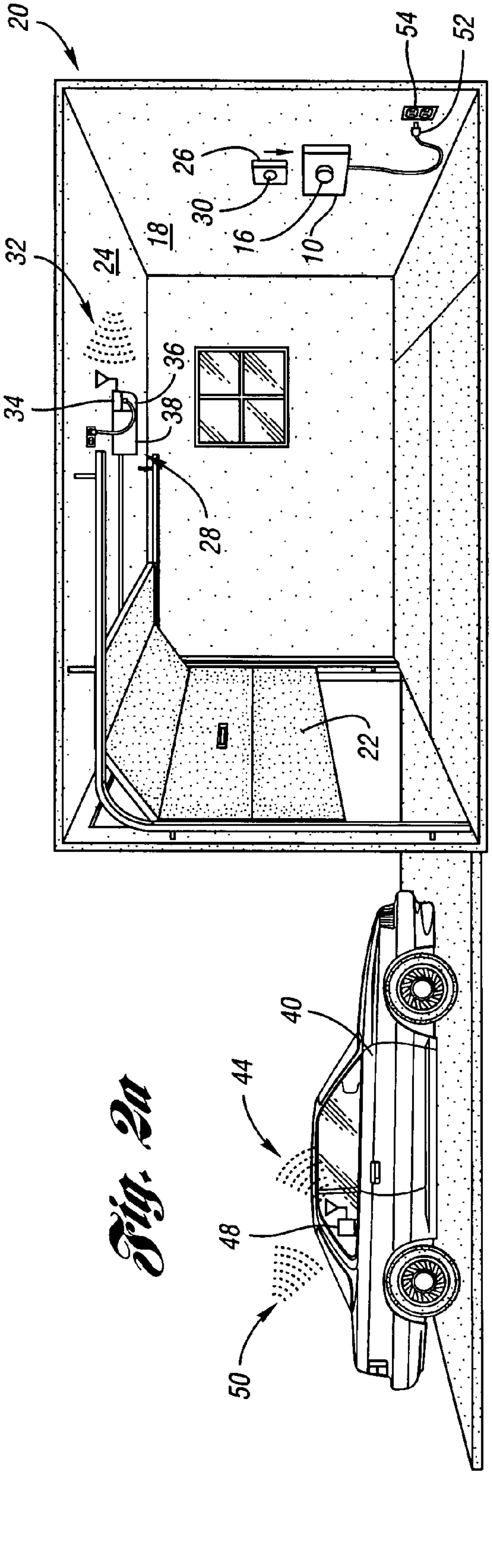
FIGS. 2*a* and 2*b* are simplified, exemplary block diagrams including another embodiment of the system of the present invention.
Figure 2B:
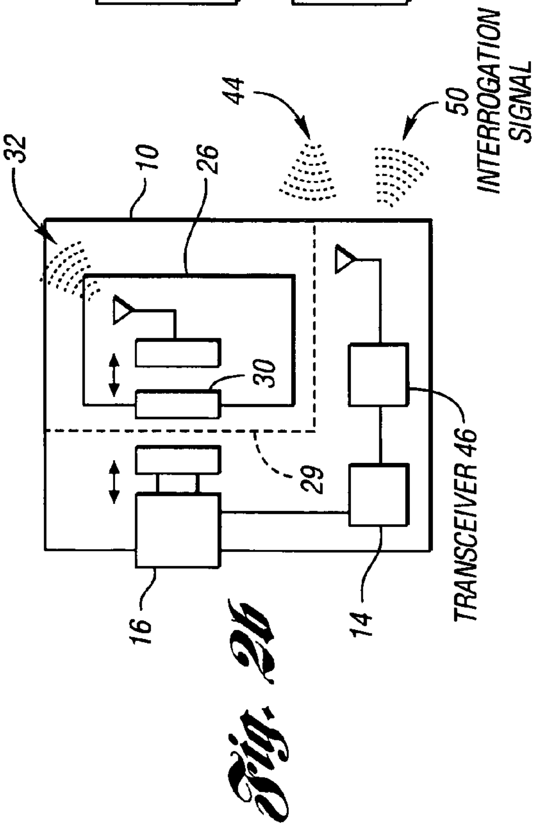

Referring now to FIGS. 2*a* and 2*b*, simplified, exemplary block diagrams including another embodiment of the system of the present invention are shown. In that regard, the block diagrams of FIGS. 2*a* and 2*b* include many of the same components as depicted in FIGS. 1*a* and 1*b*, which components are denoted in FIGS. 2*a* and 2*b* using like numerals.

As seen in FIG. 2*a*, the system includes a control module (10). As described above in connection with FIG. 1*a*, control module (10) is again adapted for mounting on a wall (18), such as inside a garage (20) having a garage door (22). It should be noted again, however, that control module (10) could alternatively be mounted elsewhere, such as on ceiling (24) in garage (20) or at any other location in garage (20) or other structure, such as an attached house (not shown). In that regard, control module (10) is preferably provided on one surface thereof with an adhesive (not shown) suitable for binding control module (10) to wall (18) or ceiling (24). Alternatively, any means known in the art suitable for mounting control module (10) to wall (18) or ceiling (24), such as screws (not shown), may also be used.

As seen in FIG. 2*b*, control module (10) preferably comprises a transceiver (46) provided in communication with a controller (14), which is in turn provided in communication with an actuator (16). Controller (14) again preferably comprises a microprocessor, although any equivalent thereof may also be used. Actuator (16) again preferably comprises a solenoid, although again any suitable equivalent may also be used. Control module (10) is again adapted to receive and hold a wireless garage door transmitter (26), which is part of and adapted for use in a garage door operating system (28). Once again, as seen in both FIGS. 2*a* and 2*b*, garage door transmitter (26) is placed by a user in a housing or receptacle (29) in control module (10) adapted for that purpose.

As previously described, such a garage door transmitter (26) includes at least one activation button (30) which, when depressed by a user, activates garage door transmitter (26) to transmit a wireless garage door control signal (32). As also previously described, garage door operating system (28) includes a receiver (34), controller (36) and garage door actuator (38). Upon receipt by receiver (34) of garage door operating signal (32) from garage door transmitter (26), controller (36) controls garage door actuator (38) to open or close garage door (22).

As seen in FIG. 2*a*, a vehicle (40) includes a vehicle transceiver (48). Vehicle transceiver (48) is preferably mounted or built-in vehicle (40). Alternatively, vehicle transceiver (48) could be a wireless transceiver provided with vehicle (40), such as in the form of a well-known key-fob (not shown). In operation, controller (14) causes transceiver (46) to at least periodically automatically transmit a wireless interrogation signal (50), which is received by vehicle transceiver (48). In response to the receipt of interrogation signal (50), vehicle transceiver (48) transmit a wireless garage door transmitter control signal (44) for use in activating garage door transmitter (26).

Garage door transmitter control signal (44) is received by transceiver (46). In response to receipt by transceiver (46) of garage door transmitter control signal (44), controller (14) generates a garage door transmitter actuator control signal (not shown), which activates actuator (16). In that regard, upon placement of garage door transmitter (26) in receptacle (29) of control module (10), actuator (16) is again preferably selectively moveable by a user in order to position actuator (16) adjacent activation button (30) of garage door transmitter (26). Upon activation by the actuator control signal, actuator (16) thus depresses activation button (30), thereby causing garage door transmitter (26) to transmit wireless garage door control signal (32). As described above, the transmission of garage door control signal (32) then effects the opening or closing of garage door (22).

As previously described, controller (14) preferably determines a signal strength of garage door transmitter control signal (44) and generates a garage door transmitter actuator control signal to activate actuator (16) only when the signal strength of garage door transmitter control signal (44) exceeds a selected threshold. Alternatively, vehicle transceiver (48) may determine a signal strength of interrogation signal (50) and transmit garage door transmitter control signal (44) only when the signal strength of interrogation signal (50) exceeds a selected threshold. In either fashion, garage door (22) is opened or closed only when vehicle (40) is within a selected proximity of garage door (22).

In either of the embodiments depicted in FIGS. 1*a–b* and 2*a–b*, for improved security, garage door transmitter control signal (44) preferably includes an identification code. Controller (14) determines if the identification code in garage door transmitter control signal (44) is valid, and generates a garage door transmitter actuator control signal to activate actuator (16) only if the identification code is determined valid. Similarly, to further improve security, garage door transmitter control signal (44) is preferably encrypted by vehicle transmitter (42) or vehicle transceiver (46), and decrypted by controller (14). In that same regard, interrogation signal (50) may also be encrypted and decrypted by controller (14) and vehicle transceiver (46), respectively.

As seen in FIGS. 1*a–b* and 2*a–b*, in both embodiments, control module (10) may be provided with electrical power using a conventional household power outlet (52) and plug (54). In that regard, a transformer (not shown) is preferably provided to convert AC power from outlet (52) to DC power. Alternatively, control module (10) may be provided with electrical power using one or more suitable batteries (not shown).

Figure 3:
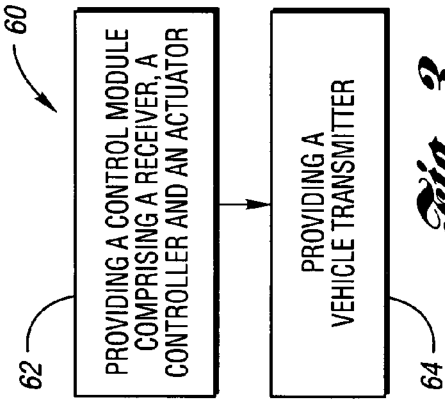
FIG. 3 is a simplified, exemplary flowchart of one embodiment of the method of the present invention.

Referring now to FIG. 3, a simplified, exemplary flowchart of one embodiment of the method of the present invention is shown, denoted generally by reference numeral 60. The method (60) of the present invention is for use with a garage door operating system comprising a wireless garage door transmitter. The method (60) comprises providing (62) a control module for mounting in a structure comprising a garage, the control module adapted to receive the garage door transmitter. The control module comprises a receiver for receiving a wireless garage door transmitter control signal, a controller to be provided in communication with the receiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door. The method (60) may further comprise providing (64) a vehicle transmitter for transmitting the garage door transmitter control signal.

As described in detail above, the vehicle transmitter is preferably built-in or mounted in the vehicle, and may be automatic or for activation by a vehicle occupant. The control module may be battery powered, or provided with power from a household outlet. As also previously described in detail, the actuator preferably comprises a solenoid, the garage door transmitter includes a transmitter activation button, and the solenoid is adapted to be positioned adjacent the transmitter activation button. Still further, the garage door transmitter control signal preferably includes and identification code, and the controller determines if the identification code is valid and generates the garage door transmitter actuator control signal in response to the garage door transmitter control signal only if the identification code is determined valid. In addition, the garage door transmitter control signal is preferably encrypted, and the vehicle transmitter is adapted to encrypt the garage door transmitter control signal and the controller is adapted to decrypt the garage door transmitter control signal.

Figure 4:
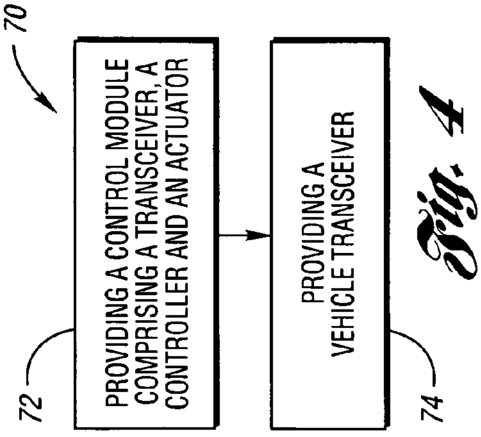
FIG. 4 is a simplified, exemplary flowchart of another embodiment of the method of the present invention.

Referring now to FIG. 4, a simplified, exemplary flowchart of another embodiment of the method of the present invention is shown, denoted generally by reference numeral 70. The method (70) of the present invention is for use with a garage door operating system comprising a wireless garage door transmitter. The method (70) comprises providing (72) a control module for mounting in a structure comprising a garage, the control module adapted to receive the garage door transmitter. The control module comprises a transceiver for automatically transmitting a wireless interrogation signal and for receiving a wireless garage door transmitter control signal, a controller to be provided in communication with the transceiver for generating a garage door transmitter actuator control signal in response to the garage door transmitter control signal, and an actuator to be provided in communication with the controller, the actuator for actuating the garage door transmitter in response to the garage door actuator control signal so that the garage door transmitter transmits a wireless garage door control signal for use in operating a garage door. The method may further comprise providing (74) a vehicle transceiver for receiving the interrogation signal and automatically transmitting the garage door transmitter control signal in response thereto.

As described in detail above, the vehicle transceiver is preferably built-in or mounted in the vehicle. The control module may be battery powered, or provided with power from a household outlet. As also previously described in detail, the actuator preferably comprises a solenoid, the garage door transmitter includes a transmitter activation button, and the solenoid is adapted to be positioned adjacent the transmitter activation button. Still further, the garage door transmitter control signal preferably includes and identification code, and the controller determines if the identification code is valid and generates the garage door transmitter actuator control signal in response to the garage door transmitter control signal only if the identification code is determined valid. In addition, the garage door transmitter control signal is preferably encrypted, and the vehicle transceiver is adapted to encrypt the garage door transmitter control signal and the controller is adapted to decrypt the garage door transmitter control signal.

It should be noted that the simplified flowcharts depicted in FIGS. 3 and 4 are exemplary of the method of the present invention. In that regard, the steps of such method may be executed in sequences other than those shown in FIGS. 3 and 4, including the execution of one or more steps simultaneously.

As is readily apparent from the foregoing detailed description, the present invention provides a universal system and method for use with a garage door operating system that overcomes the previously described problem of tuning a vehicle transmitter. The system and method of the present invention preferably include a control module for mounting in a garage having a garage door, the control module adapted to receive a wireless garage door transmitter. The module preferably includes a controller, a garage door transmitter actuator, and a receiver. Upon receipt by the receiver of a wireless signal from a vehicle transmitter, the controller controls the actuator to activate the garage door transmitter so that the garage door transmitter transmits a wireless garage door control signal for use in operating a garage door. In such a fashion, the system and method of the present invention overcome the vehicle transmitter tuning problem associated with the prior art, and are universally compatible with any garage door operating system. It should also be noted that the system and method of the present invention may be adapted to work with commercially available home automation software to actuate other wireless control devices or switches for operating other household systems such as, for example, lights or air conditioning units.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use with a garage door operating system comprising a garage door remote transmitter having an activation button, a system for actuating the garage door remote transmitter comprising:

a control module for mounting in a structure, the control module comprising, a receptacle for the garage door remote transmitter, a receiver for receiving a wireless control signal for use in actuating the garage door remote transmitter activation button, and an actuator for actuating the garage door remote transmitter activation button in response to the wireless control signal so that the garage door remote transmitter transmits a wireless garage door control signal for use in operating a garage door.

2. The system of claim 1 further comprising a vehicle transmitter for use in transmitting the wireless control signal.

3. The system of claim 2 wherein the vehicle transmitter is to be mounted in the vehicle.

4. The system of claim 2 wherein the vehicle transmitter is for use by a vehicle occupant.

5. The system of claim 1 wherein the control module further comprises a battery for providing electrical power to at least the actuator.

6. The system of claim 1 wherein the actuator comprises a solenoid.

7. The system of claim 1 wherein the wireless control signal includes and identification code, and wherein the control module determines if the identification code is valid and the actuator actuates the garage door remote transmitter activation button only if the identification code is determined valid.

8. The system of claim 1 wherein the wireless control signal is encrypted and the control module is adapted to decrypt the wireless control signal.

9. The system of claim 2 wherein the vehicle transmitter is adapted to encrypt the wireless control signal and the control module is adapted to decrypt the wireless control signal.

10. The method of claim 1 wherein the actuator is moveably positionable adjacent the activation button.

11. For use with a garage door operating system comprising a garage door remote transmitter having an activation button, a system for actuating the garage door remote transmitter comprising:

a control module for mounting in a structure, the control module comprising, a receptacle for the garage door remote transmitter, a transceiver for automatically transmitting a wireless signal and for receiving a wireless control signal for use in actuating the garage door remote transmitter activation button, and an actuator for actuating the garage door remote transmitter activation button in response to the wireless control signal so that the garage door transmitter transmits a wireless garage door control signal for use in operating a garage door.

12. The system of claim 11 further comprising a vehicle transceiver for receiving the wireless signal and automatically transmitting the wireless control signal in response thereto.

13. The system of claim 12 wherein the vehicle transceiver is to be mounted in a vehicle.

14. The system of claim 12 wherein the vehicle transceiver is for use by a vehicle occupant.

15. The system of claim 11 wherein the control module further comprises a battery for providing electrical power to at least the actuator.

16. The system of claim 11 wherein the actuator comprises a solenoid.

17. The system of claim 11 wherein the wireless control signal includes and identification code, and wherein the control module determines if the identification code is valid and the actuator actuates the garage door remote transmitter activation button only if the identification code is determined valid.

18. The system of claim 11 wherein the wireless control signal is encrypted and the control module is adapted to decrypt the wireless control signal.

19. The system of claim 12 wherein the vehicle transceiver is adapted to encrypt the wireless control signal and the control module is adapted to decrypt the wireless control signal.

20. The system of claim 11 wherein the actuator is moveably positionable adjacent the activation button.

* * * * *